(12) United States Patent
M M et al.

(10) Patent No.: US 11,294,417 B2
(45) Date of Patent: Apr. 5, 2022

(54) DISTRIBUTION OF TRUSTED PHYSICAL LAYER TIMING INFORMATION USING ATTESTATION

(71) Applicant: Cisco Technology, Inc., San Jose, CA (US)

(72) Inventors: Niranjan M M, Karnataka (IN); Nagaraj Kenchaiah, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 16/814,569

(22) Filed: Mar. 10, 2020

(65) Prior Publication Data
US 2021/0286399 A1 Sep. 16, 2021

(51) Int. Cl.
*G06F 1/08* (2006.01)
*H04L 7/00* (2006.01)

(52) U.S. Cl.
CPC .............. *G06F 1/08* (2013.01); *H04L 7/0016* (2013.01)

(58) Field of Classification Search
CPC .................................. G06F 1/08; H04L 7/0016
See application file for complete search history.

(56) References Cited

U.S. PATENT DOCUMENTS

| | | | | |
|---|---|---|---|---|
| 8,943,305 | B2 * | 1/2015 | Ho | H04L 9/0861 713/151 |
| 9,209,959 | B2 * | 12/2015 | Kim | H04L 27/2657 |
| 10,594,422 | B2 * | 3/2020 | Zhang | H04L 12/422 |
| 2012/0287948 | A1 * | 11/2012 | Ruffini | H04J 3/0658 370/503 |
| 2015/0117471 | A1 * | 4/2015 | Mizrahi | H04J 3/0667 370/512 |
| 2015/0172047 | A1 * | 6/2015 | Liang | H04L 9/0844 713/168 |
| 2016/0156427 | A1 * | 6/2016 | Yang | H04J 3/0685 370/503 |

* cited by examiner

*Primary Examiner* — Zahid Choudhury
(74) *Attorney, Agent, or Firm* — Lee & Hayes, P.C.

(57) ABSTRACT

This disclosure describes methods and systems to for a method for a first computing node to receive frequency information of a system clock. The first computing node receives the frequency information of the system clock from a second computing node at a physical layer of a connection between the first computing node and the second computing node. The first computing node also receives a message from the second computing node at above the physical layer of the connection between the first computing node and the second computing node. The message includes an attestation of the frequency information from which the first computing node may verify that the second computing node is a trusted source of the frequency information.

20 Claims, 7 Drawing Sheets

300

| TLV Type 302 | 10 SYNCE_ATTESTATION TOKEN |
|---|---|
| Length (Variable) 304 | 17 Bytes |
| Value (Attestation Information) 306 | 0x0A00102030405060708090A0B0C0D0E0F<br>• First byte, 0A, is token type for hardware fingerprint.<br>• Remaining 16 bytes is attestation payload carrying the hardware fingerprint. |

FIG. 3

DISTRIBUTION OF TRUSTED PHYSICAL LAYER TIMING INFORMATION USING ATTESTATION

TECHNICAL FIELD

The present disclosure relates generally to distribution of physical layer timing information and, more specifically, to a methodology for distribution of the physical layer timing information in a trusted manner using attestation.

BACKGROUND

Timing distribution to components of a multi-component communication system helps each component of the system to operate in synchronization with other components of the system, particularly when such the clock used by each component is synchronized to the other clocks. Clock synchronization protocols define how a node in a network or other communication system synchronizes its clock by periodically exchanging timing information messages with time sources. The timing sources may form a hierarchy, and timing information messages may be distributed from top (root) to bottom (leaves), with the root being synchronized to a reference time source, such as a timing information signal received in a Global Positioning System (GPS) signal.

Clock synchronization protocols may be used in systems such as the ASR9000 platform provided by Cisco Systems, Inc., to provide time and frequency synchronization in cluster deployments. An ASR9000 cluster is a group of two or more ASR9000 chassis connected to form a single entity from the point of view of other devices in the network. From a time and frequency prospective, all the individual chassis within the cluster may be synchronized.

If a timing source is compromised, this could impact the proper operation of components of a system, including applications being executed by those components, that rely on proper time synchronization with other components to perform their tasks. These operations may include, for example, verifying validity of tokens and certificates that are time bound, logging, synchronization of components in a cluster deployment, and other tasks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an example type-length-value (TLV) having a format of a TLV of a future enhancement portion of an ESMC SSM message.

DESCRIPTION OF EXAMPLE EMBODIMENTS

Overview

Figure 1:
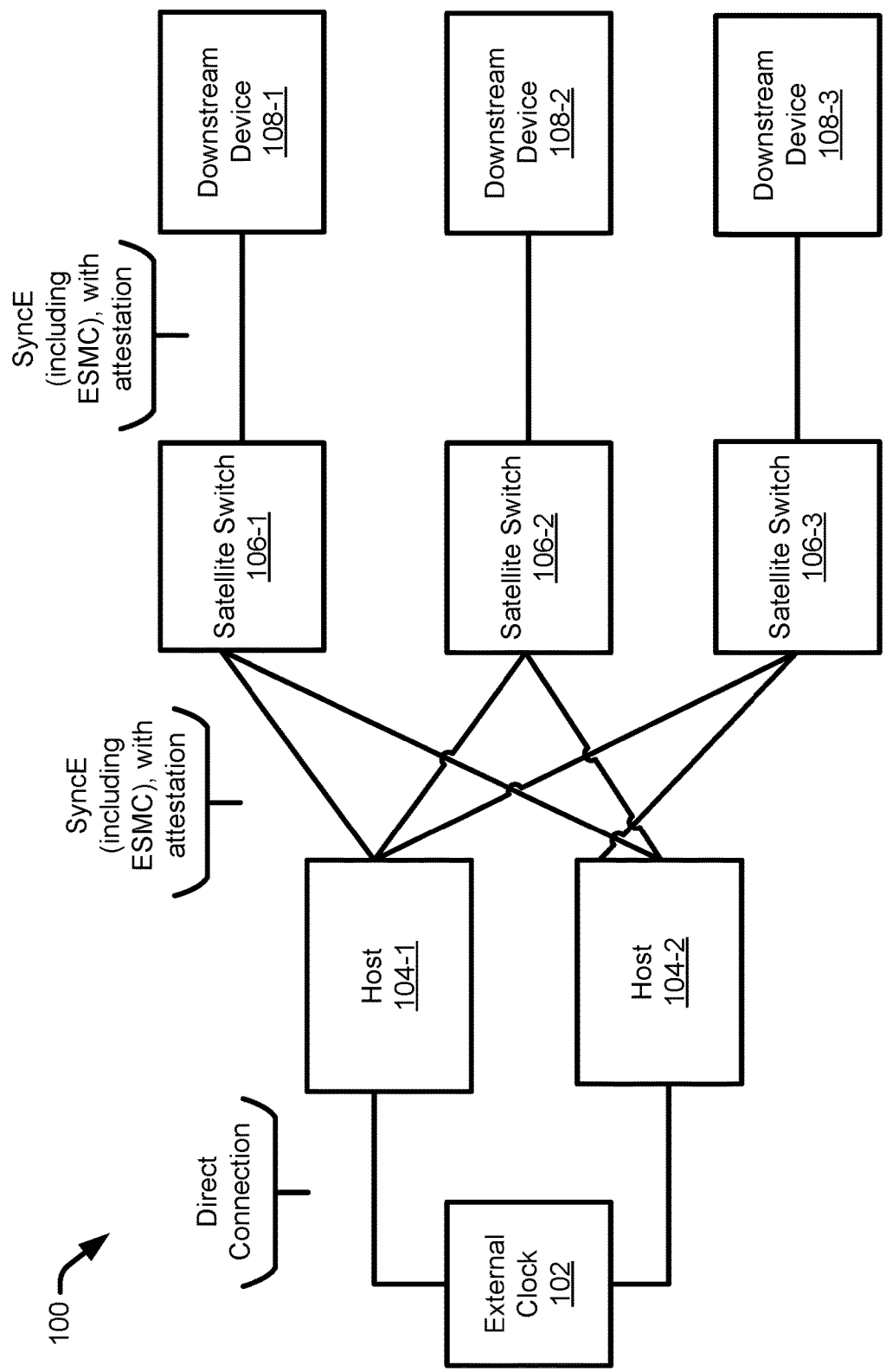
FIG. 1 is a diagram illustrating an example system in which a trusted physical clock source is distributed using attestation.

This disclosure describes methods and systems to for a method for a first computing node to receive frequency information of a system clock. The first computing node receives the frequency information of the system clock from a second computing node at a physical layer of a connection between the first computing node and the second computing node. The first computing node also receives a message from the second computing node at above the physical layer of the connection between the first computing node and the second computing node. The message includes an attestation of the frequency information from which the first computing node may verify that the second computing node is a trusted source of the frequency information.

Additionally, the techniques described herein may be performed by a system and/or device having non-transitory computer-readable media storing computer-executable instructions that, when executed by one or more processors, performs the methods described herein.

Example Embodiments

In many networks, frequency information is shared among nodes of the networks. This sharing of frequency information may be known as frequency synchronization. For example, frequency synchronization may be utilized in aspects of operating next generation networks such as for circuit emulation or for cell-tower frequency referring. Circuit emulation is a telecommunication technology used to send information over asynchronous data networks, such as Asynchronous Transfer Mode (ATM), Ethernet or Multiprotocol Label Switching (MPLS), so that the information is received error-free with constant delay, similar to a leased line.

Frequency synchronization protocols may be used to distribute precision frequency around a network. Frequency may be synchronized accurately using Synchronized Ethernet (SyncE) in devices connected by Ethernet in a network. To achieve compliance to International Telecommunication Union (ITU) specifications for Time-Division Multiplexing (TDM), differential method circuit emulation may be used with a known, common precision frequency reference at each end of the emulated circuit. Examples of frequency synchronization are provided by Synchronous Digital Hierarchy (SDH) equipment, such as Synchronous optical networking (SONET) equipment. SDH equipment may be used in conjunction with an external timing technology to provide precise frequency synchronization across the network.

SyncE provides frequency synchronization at the physical layer. With very high bit rates, transmission may be synchronized with use of a unified clock, which may keep clock fluctuations and offsets under control. Clock fluctuations and offsets are a cause of errors, which may result in a poor Quality of Service (QoS).

With SyncE, Ethernet links may be synchronized by timing their bit clocks from high-quality, stratum-1-traceable clock signals, over an Ethernet port. Each time source may have a quality level associated with it. Operational messages maintain SyncE links and allow for a node to always derive timing from the most reliable source. In SDH networks, operational messages are known as Synchronization Status Messages (SSMs). SyncE uses Ethernet Synchronization Message Channel (ESMC) messages to provide transport for SSMs, such as is documented in the ITU standard G.8264 and its related recommendations.

Each time source has a Quality Level (QL) associated with it, which indicates the accuracy of the clock. This QL information is transmitted across the network via SSMs over the Ethernet Synchronization Messaging Channel (ESMC) or SSMs contained in the SONET/SDH frames, so that each device can know the best available clock source with which to synchronize. In order to define a preferred network synchronization flow, and to help prevent timing loops, a user is able to assign priority values to particular time sources. The combination of QL information and user assigned priority levels allows each device to choose a time source to use to clock its SyncE and SONET/SDH interfaces, as described in the ITU standard G.781.

Operational messages, such as ESMC messages, may be used to provide a level of trustworthiness to the timing information. For example, an ESMC message may include attestation information that can be used to validate the integrity of the source of the timing information, such as frequency synchronization information, that is provided at the physical layer. Validating the integrity of the source of the timing information may include, for example, validating quality level information, for the frequency synchronization information, that is provided in an ESMC or in another operational message.

For example, host devices in a network may each be directly connected to a high-quality clock. The host devices may be, for example, ASR9000 series routers from Cisco Systems, Inc. The host devices may be connected to one or more satellite devices. Satellite devices may provide a relatively inexpensive way to extend ports of the host devices by using port-extenders. The satellite devices may comprise one or more switches, which may be managed by the ASR9000 series host. In other words, the ASR9000 satellite system may include one or more satellite switches connected to one or more ASR9000 host devices and collectively realized and managed as a single entity. Interconnection between the ASR9000 routers and the satellite switches may be via standard ethernet interfaces (such as 10 Gigabit Ethernet), but are not necessarily restricted to any particular type or speed of ethernet.

In some examples, one or more component devices of a communication network system are other than ASR9000 series devices. The component devices may communicate by other than a SyncE protocol, and operational messages may be other than ESMC SSM messages. For example, the component devices of the communication network system may be devices that communicate timing information at a physical layer of the connections between the devices. The timing information may be for example, information from which a node may synchronize a frequency of its local clock to a frequency of a master or other reference clock, and/or may synchronize aspects of its local clock other than frequency. The timing information may be frequency synchronization information provided according to a SyncE protocol for communication between the providing node and the receiving node or may be timing information other than or instead of frequency information, and the receiving node may synchronize aspects of its clock in addition to or instead of frequency.

The attestation information may be, for example, a hardware fingerprint that is generated, for example, using a unique immutable characteristic of a device (such as a device ID that may have been stored into the device at manufacture) and which may be signed (such as using a public/private key functionality) in a manner that tampering can be detected with access to the public key. Other types of tokens may be utilized, other than a hardware fingerprint. In some examples, each computing node is manufactured with a public/private key pair built into the hardware, called an endorsement key. The endorsement key is uniquely creatable by a particular computing node or platform and is signed by a trusted Certification Authority such that any entity or device knowing the public key may verify the integrity of the device that provided the endorsement key.

More broadly, attestation is a Trusted Computing technology that can be applied to networking. Trusted Computing technology can be applied, for example, to a router/switch to review logs from layer 1 or layer 2 connected devices which maintains these logs in trusted storage. These logs can be known to be uncompromised given that a provider of the devices, such as Cisco Systems, Inc, may embed the private key into every trust anchor produced for a hardware device. The device's corresponding public key may be published as a certificate. A peer device may then push reports of integrity measurements and updates from trusted storage periodically and/or on some log/measurement entry event. Reviewing any provided signed logs allows a good understanding of the current trustable state of a peer device. Furthermore, by looking back at a set of transactions which have occurred since boot-time, a determination can be made regarding the trustworthiness of the information which that peer device is asserting.

Attestation functionality may be embedded in a wide variety of devices, such as mobile phones, personal computers, and routers. Attestation may be used as a hardware root of trust and offer proof of integrity of a node. Integrity may include, for example, integrity of hardware. Integrity may also include, for example, integrity of software, such as integrity of a micro loader, a Basic Input/Output System (BIOS), boot loader, kernel and/or operating system. As another example, integrity may include integrity of runtime, such as runtime-application binaries, libraries and config/manifest files.

The attestation information may be provided in operational messages other than ESMC messages via which nodes communicate according to a SyncE protocol. The operational messages may be messages used by the devices to operate communication links between the devices, such that the links are maintained in a network of the devices.

The operational messages may be provided at above the physical layer of the communication connections between the devices. The attestation information may be provided in one or more fields of an operational message provided at above the physical layer of a communication connection, such as in TLV fields of the operational message. The TLV fields may be, for example, provided for in a standard as a future enhancement portion of an operational message, such as a future enhancement portion of an ESMC message formatted according to a SyncE communication protocol, as defined in one or more ITU standards.

A node receiving a message with the attestation information may validate the integrity of a device providing timing information at the physical layer, including validating the integrity of a device providing quality level information related to the timing information, and from which a device may decide or otherwise determine which of a plurality of timing information to use for the device to synchronize an internal clock being maintained by the device. Quality level information may be included, for example, in a field of an operational message, such as a TLV field of an operational message. The TLV field may be a field of an ESMC message communicated according to a SyncE protocol.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating an example system 100 in which a trusted timing information (for example, frequency synchronization information of a trusted physical clock source) is distributed using attestation. Referring to the FIG. 1 example system, the trusted physical clock source is an external clock source 102. For example, the external clock source 102 may be a signal originating from a GPS satellite. In other examples, the external clock source 102 may be a signal originating from some other clock source, such as a network-connected time server or a connected radio clock or an atomic clock.

In the FIG. 1 example system 100, the external clock source 102 is directly connected to two host devices—a first host device 104-1 and a second host device 104-2. Each of the first host device 104-1 and the second host device 104-2 may be, for example, an ASR9000 series router device provided by Cisco Systems, Inc. In other example systems, at least one of the first host device 104-1 or the second host device 104-2 may be different types of network communication devices, other than an ASR9000 series router.

In the FIG. 1 example system 100, each of the host device 104-1 and the host device 104-2 is communicatively coupled to three different satellite switch devices—satellite switch device 106-1, satellite switch device 106-2 and satellite switch device 106-3. The host device 104-1 and the host device 104-2, along with the satellite switch device 106-1, the satellite switch device 106-2 and the satellite switch device 106-3 may form an overall virtual switching system. The satellite switch device 106-1, the satellite switch device 106-2 and the satellite switch device 106-3 each may be, for example, an ASR9000v router provided by Cisco Systems, Inc. Interconnection between the host device 104-1 and the host device 104-2 and the satellite switch device 106-1, the satellite switch device 106-2 or the satellite switch device 106-3 may be through standard ethernet interfaces, which may typically be 10 Gigabit Ethernet, but are other types and/or line speed of Ethernet in some examples.

In some examples, the host device 104-1 and the host device 104-2 and the satellite switch device 106-1, the satellite switch device 106-2 or the satellite switch device 106-3 are not located in the same geographic location. This means that the connections between the host device 104-1 and the host device 104-2 and the satellite switch device 106-1, the satellite switch device 106-2 or the satellite switch device 106-3 need not be of nominal length, such as for only intra-location or intra-building use. The connections between the host device 104-1 and the host device 104-2 and the satellite switch device 106-1, the satellite switch device 106-2 or the satellite switch device 106-3 may be, in some examples, tens, hundreds, or even thousands of miles in length, thereby collectively creating a logical satellite switch spanning a large geography.

In some examples, many or all of the features on regular GigE ports of the host device 104-1 and the host device 104-2 are also available on access ports of the satellite switch device 106-1, the satellite switch device 106-2 or the satellite switch device 106-3 in a functionally identical and consistent manner. A typical application of a satellite system may be in the access and aggregation layers of a network. By integrating the access switches along with the aggregation or core switch, it may be possible that there are no feature gaps between the access switch and the aggregation or core switch. All features, such as carrier ethernet features, Quality of Service (QoS) and Operation, Administration, and Maintenance (OAM), may function consistently, from access to core, due to this integrated approach. In the FIG. 1 example system 100, the satellite switch device 106-1, the satellite switch device 106-2 or the satellite switch device 106—may act under the management control of the host device 104-1 and/or the host device 104-2. The complete configuration and management of the satellite switch device 106-1, the satellite switch device 106-2 or the satellite switch device 106-3 may be, for example, performed through a control plane and a management plane of the host device 104-1 and/or the host device 104-2.

In the FIG. 1 example system 100, the interconnection between the host device 104-1 and the host device 104-2 and the satellite switch device 106-1, the satellite switch device 106-2 or the satellite switch device 106-3 is via Synchronous Ethernet (SyncE) communication. SyncE is standardized by the International Telecommunication Union (ITU) as three recommendations, which includes ITU-T Rec. G.8261 that defines aspects about the architecture and the wander performance of SyncE networks; ITU-T Rec. G.8262 that specifies Synchronous Ethernet clocks for SyncE; and ITU-T Rec. G.8264 that describes the specification of Ethernet Synchronization Messaging Channel (ESMC). In SyncE communication, ESMC is a logical communication channel over which SSM information may be transmitted in ESMC protocol data units (PDUs). SyncE also provides the Ethernet physical layer network level frequency distribution of known common precision frequency references. Clocks for use in SyncE may be compatible with clocks used in a SONET/SDH synchronization network. To achieve network synchronization, synchronization information may be transmitted through the network via synchronous network connections, such as synchronous ethernet connections.

In SONET/SDH, the communication channel for conveying timing information is SSMs and, in SyncE, the communication channel for conveying timing information is ESMC. For example, ESMC messages carry a Quality Level identifier that identifies the timing quality of the synchronization trail. Quality Level values in a Quality Level type-length-value (TLV) of an ESMC may be the same as quality level values defined for SONET and SDH SSM protocols. Information provided by SSM Quality Level values during the network transmission helps a node to determine the most reliable source available to it from which to derive timing information. An ESMC message may include a standard Ethernet header for an organization-specific slow protocol; an ITU-T Organizationally Unique Identifier (OUI), a specific ITU-T subtype; an ESMC-specific header; a flag field; and a TLV structure. ESMC may be used with synchronization selection algorithms, based on determining optimal synchronization information based on at least on the quality level values provided in the ESMC messages.

In the FIG. 1 example system 100, the ESMC messages include attestation information. The attestation information may provide proof of integrity of the SyncE links between the devices (such as between the host device 104-1 and the host device 104-2 and the satellite switch device 106-1, the satellite switch device 106-2 or the satellite switch device 106-3) and, thus, provide proof of integrity of clock or other timing information provided at a physical layer of those links. In other example systems, in which the links are not SyncE links, messages used by those links in those example systems may also include attestation information to provide proof of integrity of the links between the devices and, thus, provide proof of integrity of clock or other timing information that is being provided at a physical layer of those links.

Still referring to FIG. 1, a downstream device 108-1 is in communication with satellite switch device 106-1; a downstream device 108-2 is in communication with satellite switch device 106-2; and a downstream device 108-3 is in communication with satellite switch device 106-3. In other examples, each of the satellite switch device 106-1, the satellite switch device 106-2 or the satellite switch device 106-3 may be connected to fewer or more downstream devices. The downstream device 106-1, downstream device 106-2 or downstream device 106-3 may be, for example, an Ethernet-capable client device such as a personal computer, printer, game console, and/or a device and/or sensor (such as an electric meter, smart thermostat or camera, for example) used in Internet-of-Things (IOT) systems. These are just examples, and the downstream device 106-1, downstream device 106-2 or downstream device 106-3 may comprise one or more of many different types of devices, with one or more of many different types of functionality.

In the FIG. 1 example system 100, communication between one of the satellite switch device 106-1, the satellite switch device 106-2 or the satellite switch device 106-3 with a respective downstream device 106-1, downstream device 106-2 or downstream device 106-3 may be using a SyncE protocol, where the ESMC messages include attestation information, which may be similar to that discussed above with respect to communication between the host devices 104-1 or 104-2 and the satellite switch device 106-1, the satellite switch device 106-2 or the satellite switch device 106-3. In other example systems, the links are not SyncE links, and messages used by those links in those example systems may also include attestation information to provide proof of integrity of a one or more source devices providing information over links between the devices and, thus, provide proof of integrity of timing information provided at a physical layer of those links.

Figure 2:
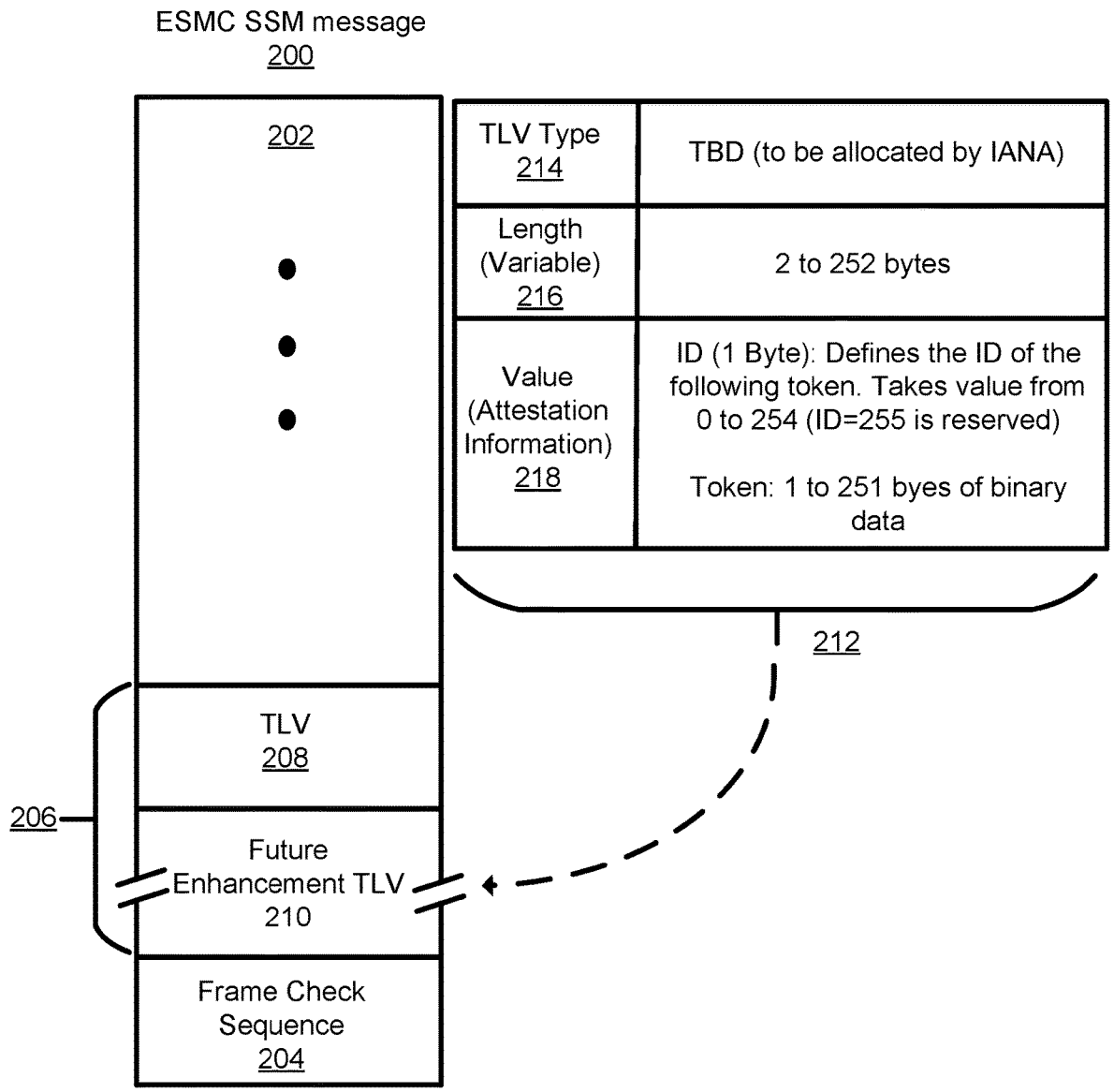
FIG. 2 illustrates an example Ethernet Synchronization Message Channel (ESMC) Synchronization Status Message (SSM).

Referring now to FIG. 2, a format of an example ESMC SSM message 200 is illustrated. The message portion 202 is a header portion that may include the following fields, according to Recommendation ITU-T G.8264/Y.1364, dated August 2017:

| Octet number | Size/bits | Field |
| --- | --- | --- |
| 1-6 | 6 octets | Destination address = 01-80-C2-00-00-02 (hex) |
| 7-12 | 6 octets | Source address |
| 13-14 | 2 octets | Slow protocol Ethertype = 88-09 (hex) |

-continued

| Octet number | Size/bits | Field |
| --- | --- | --- |
| 15 | 1 octet | Slow protocol subtype = 0A (hex) |
| 16-18 | 3 octets | ITU-OUI = 00-19-A7 (hex) |
| 19-20 | 2 octets | ITU subtype |
| 21 | bits 7:4 | Version |
|  | bit 3 | Event flag |
|  | bits 2:0 | Reserved |
| 22-24 | 3 octets | Reserved |

Furthermore, a portion 204 of the example ESMC SSM message 200 includes a frame check sequence, as defined in clause 4 of the IEEE 802.3 standard.

A portion 206 of the example ESMC SSM message 200 is a payload portion. In the FIG. 2 example ESMC SSM message 200, the payload portion 206 includes a TLV portion 208 whose values are also defined by the Recommendation ITU-T G.8264/Y.1364. For example, the TLV portion 208 of the FIG. 2 example ESMC SSM message 200 may include quality level information that may identify the timing quality of synchronization information provided at the physical layer. Quality level values in a quality level TLV may be the same as quality level values defined for SONET and SDH SSMs. Information provided by SSM QLs during the network transmission may be used by a node to determine the most reliable or highest quality source from which to derive timing.

The payload portion 206 also includes a "future enhancement" TLV portion 210. An example of the future enhancement TLV portion 210 is described, for example, in Recommendation ITU-T G.8264/Y.1364, dated August 2017, at section 11.4. Referring still to FIG. 2, the future enhancement TLV portion 210 of the example ESMC SSM message 200 may include a TLV 212 in which attestation information is provided and from which a computing node that receives the ESMC SSM message 200 may verify that the providing computing node is a trusted source of frequency or other timing information. This may include, for example, validating quality level information, for frequency synchronization information, in the TLV portion 208 of the ESMC SSM message 200.

FIG. 2 illustrates an example format for the TLV 212, and other formats for a TLV including attestation information may be utilized. In some message formats, such as formats other than an ESMC format, attestation information payload may be included in other than a TLV format. With respect to the example format for the TLV 212, a TLV type portion 214 has a value that is to be determined. That is, the value may be allocated by the Internet Assigned Numbers Authority (IANA), which is an organization that globally coordinates Domain Name System (DNS) Root, Internet Protocol (IP) addressing, and other Internet protocol resources. In the example format for the TLV 212, a length portion 216 value is variable, and may be anywhere from 2 to 252, indicating a length in bytes of a value portion 218. The value portion 218 includes the attestation information. In the FIG. 2 example format for the TLV 212, the value portion 218 includes an identification portion that is one byte and a token that may be one to 251 bytes of binary data. The identification portion may, for example, define an identification of the token. In an example, the identification value may be between 0 and 254, with 255 being a reserved value.

FIG. 3 illustrates an example TLV 300 having the format of a TLV of the future enhancement portion 212. Referring to FIG. 3, the TLV type value 302 of the example TLV 300 is 0x10, which corresponds to the type SYNCE_ATTES- TION TOKEN. As described above, an actual value of the SYNCE_ATTESTATION TOKEN type may be assigned by IANA. The length value 304 of the example TLV 300 is 17, indicating that the payload value in the value portion 306 is 17 bytes long. This is an example, and a length value 304 of the example TLV 300 may other than 17 bytes, depending on the length of the payload value in the value portion 306 of the example TLV 300.

In the example TLV 300, the value portion 306 is the hexadecimal value 0x0A00102030405060708090A0B0C0D0E0F. In the example TLV 300, the first byte being 0x0A indicates that the token type of the TLV 300 value portion 306 is "hardware fingerprint." The remaining sixteen bytes of the value portion comprise the attestation payload carrying the hardware fingerprint. A hardware fingerprint may be generated, for example, using a unique immutable characteristic of a device (for example, a device ID that may have been stored into the device at manufacture) and which may be signed (such as using public/private key functionality) such that tampering can be detected using the public key. Other token types may be utilized, besides a hardware fingerprint.

In some examples, each computing node is manufactured with a public/private key pair built into the hardware, called an endorsement key. The endorsement key is uniquely creatable by a particular computing node or platform and is signed by a trusted Certification Authority, such that any entity or device knowing the public key may verify the integrity of the device that provided the endorsement key.

More broadly, attestation is a Trusted Computing technology which can be applied to networking. It can be applied, for example, to a router/switch to review logs from layer 1 or layer 2 connected devices which maintains these logs in trusted storage. These logs can be known to be un-compromised given that a provider of the devices, such as Cisco Systems, Inc, may embed the private key into every trust anchor produced for a hardware device. The device's corresponding public key may be published as a certificate. A peer device may then push reports of integrity measurements and updates from trusted storage periodically and/or on some log/measurement entry event. Reviewing any provided signed logs allows a good understanding of the current trustable state of a peer device. Furthermore, by looking back at a set of transactions which have occurred since boot-time, a determination can be made regarding the trustworthiness of the information which that peer device is asserting.

This type of functionality may be embedded in a wide variety of devices, such as mobile phones, personal computers, and routers. Attestation may be used as a hardware root of trust and offer proof of integrity of a node. Integrity may include, for example, integrity of hardware. Integrity may also include, for example, integrity of software, such as integrity of a micro loader, a Basic Input/Output System (BIOS), boot loader, kernel and/or operating system. As another example, integrity may include integrity of runtime, such as runtime-application binaries, libraries and config/manifest files.

Figure 4:
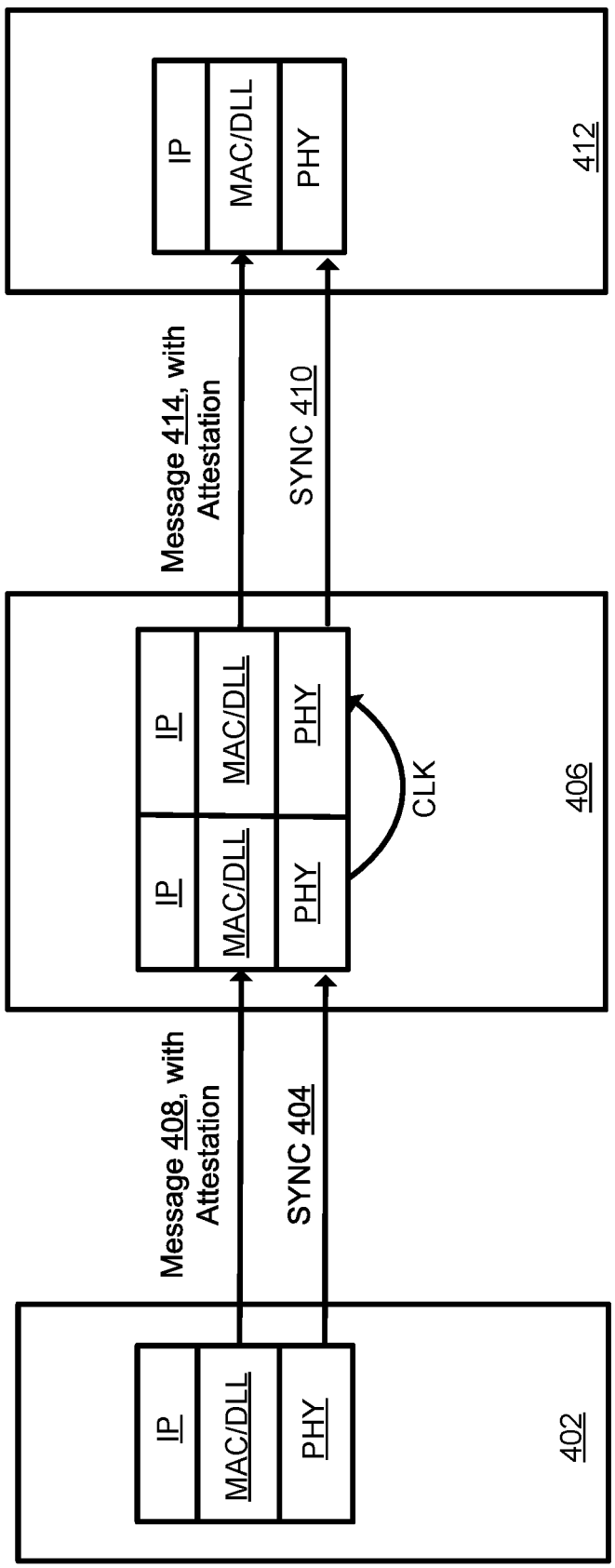
FIG. 4 is a diagram illustrating an example of how frequency synchronization information may be provided from one node to another node and even to yet another node, with attestation.

FIG. 4 is a diagram illustrating how timing information such as frequency synchronization information may be provided from one node to another node and even to yet another node. Furthermore, an attestation may be provided such that the node receiving the timing information, such as frequency synchronization information, may verify the integrity of the node providing the timing information. The attestation may be provided, for example, in an operational message of the network. Referring to FIG. 4, a node 402 provides timing information, such as frequency synchronization information SYNC 404, to a node 406. The node 402 may be, for example, a source of a master clock for a network. The node 402 provides the timing information 404 to the node 406 at a physical layer (PHY) of a communication connection between the node 402 and the node 406. Furthermore, the node 402 provides a message 408, with attestation, to the node 406. The message 408 may be an operational message of a network that is provided at above the physical layer, such as at a media access control (MAC) or data link layer of a communication connection between the node 402 and the node 406. In some examples, a layer above a physical layer may be referred to as a frame layer, such as in Ethernet types of protocols.

Referring still to FIG. 4, the node 406 provides timing information, such as frequency synchronization information SYNCH 410, to a node 412. The node 406 provides the timing information 410 to the node 412 at a physical layer of a communication connection between the node 406 and the node 412. Furthermore, the node 406 provides a message 414, with attestation, to the node 412. The message 414 may be an operational message of a network and that is provided at above the physical layer.

The communication of the timing information, such as frequency synchronization information SYNC 404, and the timing information, such as frequency synchronization information SYNC 410, as well as the message 408 and the message 414, may be according to a SyncE protocol. The message 408 and the message 414 may be ESMC messages, and the attestation in the message 408 and in the message 414 may be provided in a future enhancement TLV of the ESMC message, such as is described above with reference to FIG. 2 and FIG. 3. In some examples, one or more different communication protocols are utilized.

Figure 5:
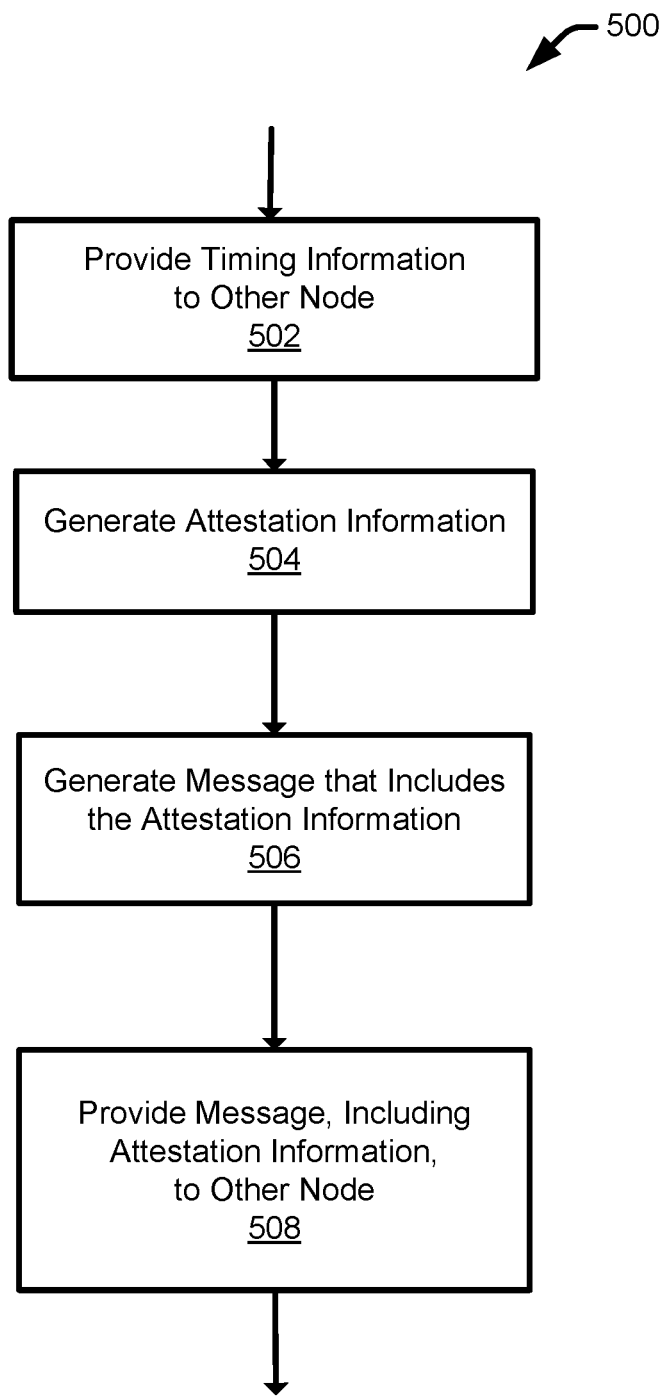
FIG. 5 is a flowchart illustrating an example process by which timing information may be provided from a node to a receiving node.

FIG. 5 is a flowchart illustrating a process by which timing information may be provided from a node to a receiving node. The providing node also provides attestation information from which the receiving node can verify the integrity of the providing node and, thus, the timing information provided by the providing node. Referring back to FIG. 1, the providing node may be, for example, one of the host device 104-1 or the host device 104-2. Or the providing node may be, for example, one of the satellite switch device 106-1, the satellite switch device 106-2 or the satellite switch device 106-3. The receiving node may be, for example, one of the satellite switch device 106-1, the satellite switch device 106-2 or the satellite switch device 106-3. Or the receiving node may be, for example, one of the downstream device 108-1, the downstream device 108-2 or the downstream device 108-3. Referring back to FIG. 4, the providing node may be, for example, one of the device 402 or the device 406, and the receiving node may be, for example, one of the device 406 or the device 412.

Referring to FIG. 5, at 502, the providing node provides timing information to the receiving node. The providing timing information may be, for example, provided as a SYNC signal (FIG. 4) at a physical layer of a connection between the providing node and the receiving node. The timing information, which may be a SYNC signal or other type of signal, may include timing information such as frequency synchronization information from which the receiving node may synchronize a frequency of its internal clock to a master frequency represented by the timing information. For example, the timing information may be a timing information signal as provided for in various ITU-T standards related to SyncE communication. The timing information may represent a frequency of a mater clock or other reference clock.

At 504, the providing node generates attestation information. The attestation information may be, for example, information that can be used by the receiving node to validate the source of the timing information, such as frequency synchronization information, that is provided at the physical layer. This may include, for example, a hardware fingerprint and/or other token from which the integrity of a providing node may be verified. For example, the providing node may generate a hardware fingerprint using a unique immutable characteristic of the providing node (for example, a device ID that may have been stored into the device at manufacture) and which may be signed (such as using a public/private key functionality) such that tampering can be detected by the receiving node, with access to the public key. Other token types may be utilized, other than hardware fingerprint. In some examples, generating the attestation information by the providing node may comprise fetching the attestation information, previously stored, from a memory of the providing node.

At 506, the providing node generates a message that includes the attestation information. For example, the providing node may generate an operational message for the connection between the providing node and the receiving node. The operational message may be, for example, an ESMC message of the type used by nodes communicating according to a SyncE protocol. The message may include, for example, a standard Ethernet header for a slow protocol, an ITU-T specific header and a flag field. The message may include, for example, a TLV-type payload, or a payload included in the message in some manner other than using a TLV-type payload. In some examples, the attestation information is provided in the message as a TLV, with the type of the TLV indicating attestation information and, in some examples, a particular form of attestation information. The attestation information may be provided, for example, in a future enhancement field of an ESMC message of the SyncE protocol. In some examples, the operational message is other than an ESMC message.

At 508, the providing node provides the message, including the attestation information, to the receiving node. For example, the message may be an ESMC message and the providing node may provide the ESMC message using a SyncE protocol. The providing node may provide the message, for example, at a layer above the physical layer of a communication protocol for communication between the providing node and the receiving node. In other examples, the providing node provides the message using other than a SyncE protocol.

In some examples, the message such as an ESMC message includes proof of freshness. The proof of freshness may include, for example, a signature using a private key. The private key may be or include, for example, a Secure Unique Device Identifier (SUDI) or attestation key.

Figure 6:
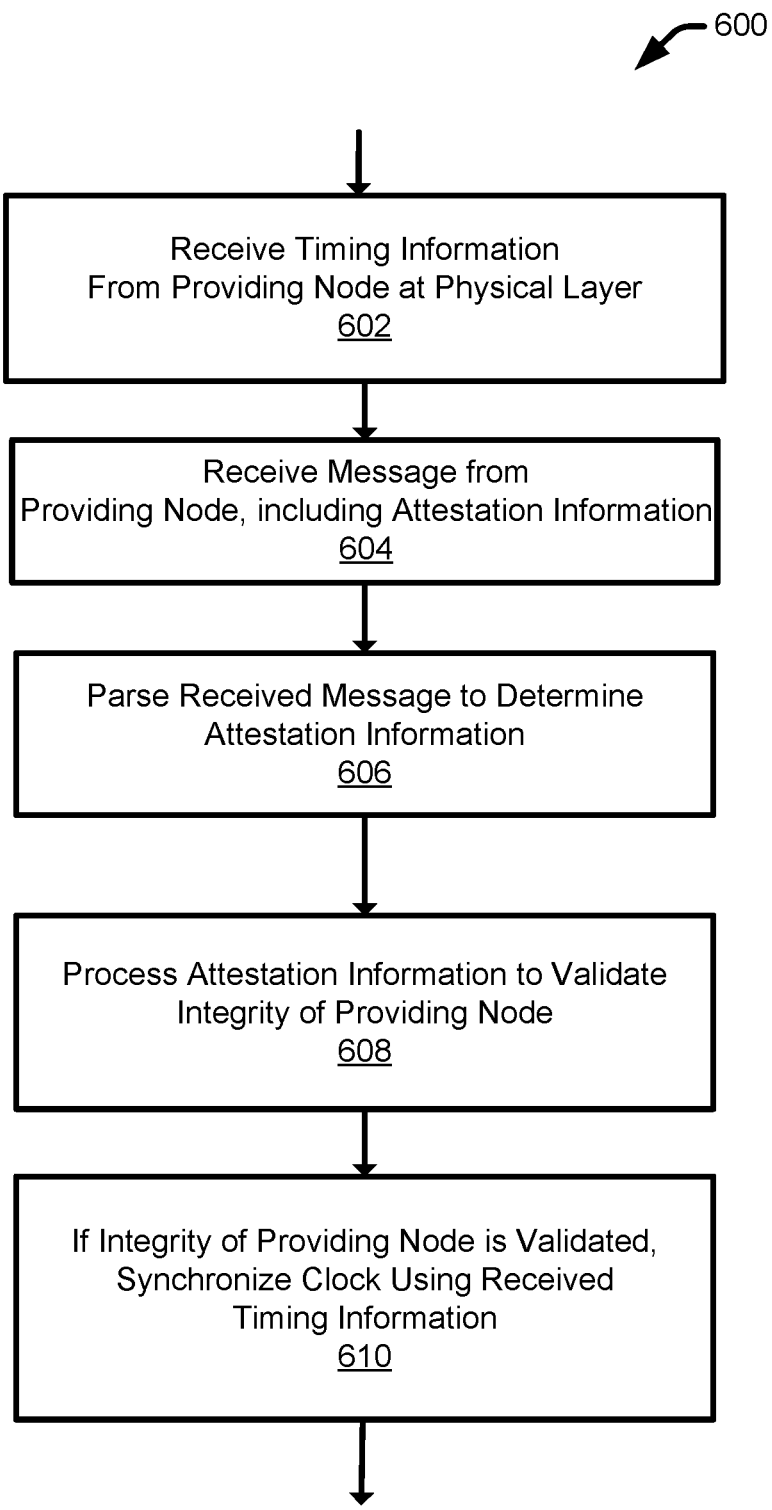
FIG. 6 is a flowchart illustrating an example process by which timing information and attestation information may be received by a node from a providing node.

FIG. 6 is a flowchart illustrating a process by which timing information and attestation information may be received by a node from a providing node. The receiving node receives the attestation information from which the receiving node can verify the integrity of the providing node.

At 602, the receiving node receives the timing information from a providing node. The receiving node may receive the timing information from the providing node at a physical layer of a connection between the receiving node and the providing node. The timing information may be, for example, information from which the receiving node may synchronize a frequency of its local clock to a frequency of a master or other reference clock. The timing information may be frequency synchronization information provided according to a SyncE protocol for communication between the providing node and the receiving node.

At 604, the receiving node receives a message, including attestation information, from the providing node. The message may be, for example, an operational message by which links, including a link between the providing node and the receiving node, are maintained in a network. The message may be, for example, an ESMC message generated and provided according to a SyncE communication protocol. The receiving node may receive the message, for example, at a layer above the physical layer of a communication protocol for communication between the providing node and the receiving node.

At 606, the receiving node parses the received message. For example, the message may have been formatted by the providing node according to a protocol by which the providing node and the receiving node are communicating. The protocol may, for example, be such that the message payload is provided in TLV fields of the message. The receiving node may parse such a message by processing the type and length values in the TLV fields, using at least the type and length values to interpret a value in the "V" portion of the TLV fields. In some examples, the attestation information is provided in such a TLV field, which may be, for example, a future enhancement TLV of an ESMC message according to a SyncE protocol.

The attestation information may be, for example, a hardware fingerprint and/or other token from which the integrity of the providing node may be verified. For example, the providing node may have generated the hardware fingerprint using a unique immutable characteristic of the providing node (for example, a device ID that may have been stored into the device at manufacture) and which may be signed (such as using a public/private key functionality) such that tampering can be detected by the receiving node, with access to the public key. Other token types may be utilized, other than a hardware fingerprint.

At 608, the receiving node processes the attestation information to validate the integrity of the providing node. This may include, for example, applying to the attestation information a known or otherwise accessible public key associated with the providing node, authenticating the identity of the providing node. In this way, it can be determined whether the attestation information has been tampered with, thus providing for the receiving node to validate the integrity of the providing node. In other examples, different methods may be utilized to validate the integrity of the providing node, based on the attestation information in the received message.

At 610, if the integrity of the providing node is validated, the receiving node synchronizes its clock using the received timing information. For example, the receiving node may synchronize a frequency of a clock, maintained internally at the receiving node, using frequency information in the receiving timing information. In other examples, the receiving timing information may include timing information other than or instead of frequency information, and the receiving node may synchronize aspects of its clock in addition to or instead of frequency.

Figure 7:
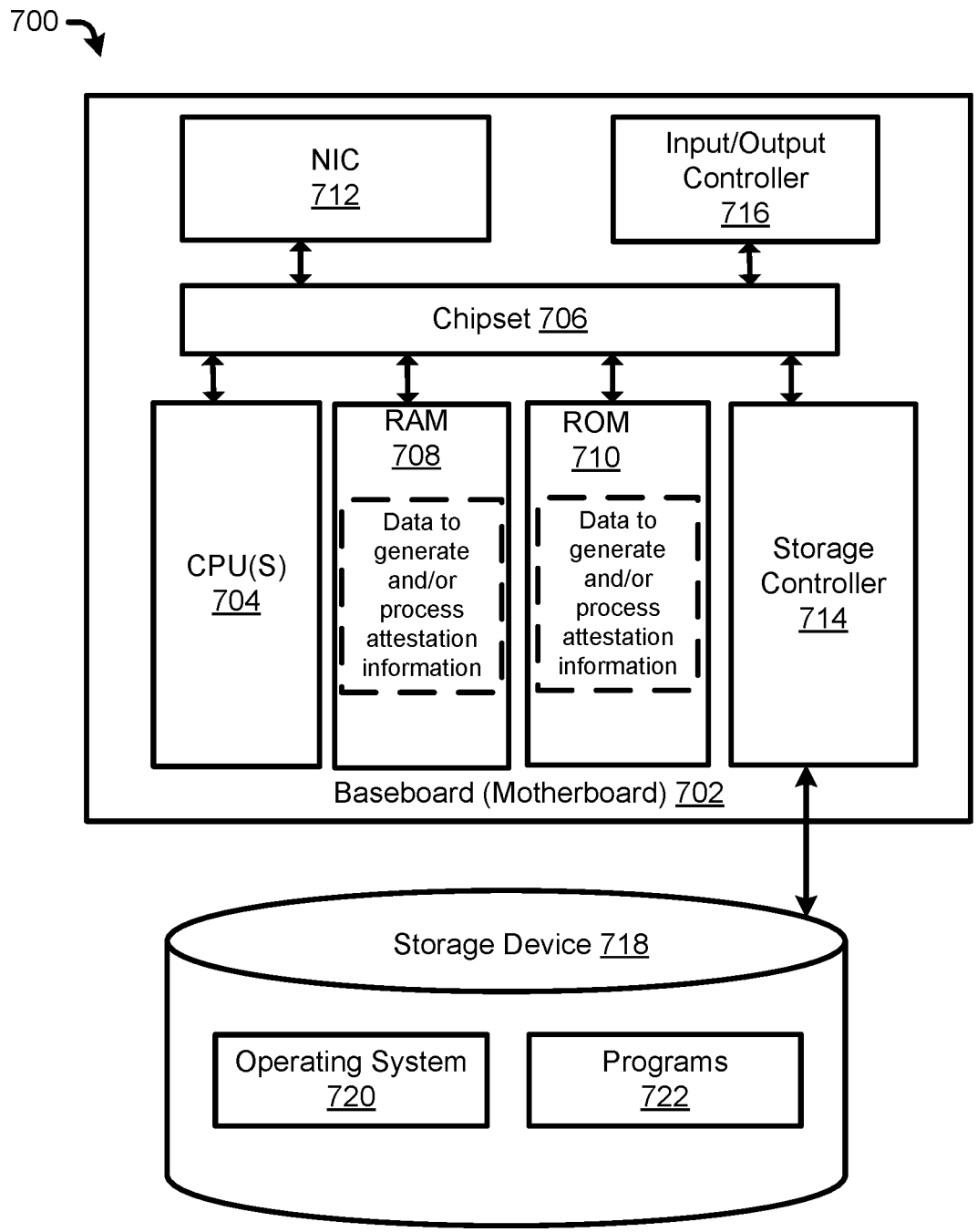
FIG. 7 illustrates an example computer architecture for a computer capable of executing program components for implementing the functionality described herein.

FIG. 7 illustrates an example computer architecture for a computer 700 capable of executing program components for implementing the functionality described above. The computer architecture shown in FIG. 7 illustrates an architecture of a server computer, workstation, desktop computer, laptop, tablet, network appliance, e-reader, smartphone, network switch, or other computing device, and can be utilized to execute any of the software components presented herein. The computer 700 may, in some examples, correspond to a network infrastructure device discussed herein.

The computer 700 includes a baseboard 702, or "motherboard," which may be a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be, for example, standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein. As illustrated in FIG. 7, the ROM 710 or NVRAM can also store data usable by the computer 700 to generate and/or process attestation information in messages exchanged among the computer 700 and other devices. In other examples, this data may be stored elsewhere, such as in RAM 708.

The computer 700 can operate in a networked environment using logical connections to remote computing devices and computer systems through a network. For example, the chipset 706 can include functionality for providing network connectivity through a Network Interface Controller (NIC) 712, such as a gigabit Ethernet adapter. The NIC 712 can connect the computer 700 to other computing devices over a network. It should be appreciated that multiple NICs 712 can be present in the computer 700, connecting the computer to other types of networks and remote computer systems. In some instances, the NICs 712 may include at least one ingress port and/or at least one egress port. An input/output controller 716 may be provided for other types of input/output.

The computer 700 can be connected to a storage device 718 that provides non-volatile storage for the computer. The storage device 718 can store an operating system 720, programs 722, and data, for example. The storage device 718 can be connected to the computer 700 through a storage controller 714 connected to the chipset 706. The storage device 718 can include one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like. For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the storage device 718 described above, the computer 700 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 700.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method for a first computing node to receive frequency information of a system clock, comprising:
    receiving, by the first computing node and via a first layer of a connection between the first computing node and a second computing node, the frequency information of the system clock from the second computing node, the first layer corresponds to a physical layer of the connection; and
    receiving, by the first computing node and from the second computing node, a message via a second layer of the connection between the first computing node and the second computing node, the second layer corresponding to a layer above the physical layer of the connection, the message including an attestation of the frequency information from which the first computing node may verify that the second computing node is a trusted source of the frequency information.

2. The method of claim 1, wherein:
the attestation is included in a field of the message.

3. The method of claim 1, wherein:
the attestation is within a type-length value (TLV) encoding in the message.

4. The method of claim 1, wherein:
the first computing node and the second computing node are computing nodes of a synchronous ethernet (SyncE) network; and
the message is an Ethernet Synchronization Message Channel (ESMC) message.

5. The method of claim 4, wherein:
the attestation is within a future enhancement TLV portion of the ESMC message.

6. The method of claim 1, wherein:
the attestation includes at least one of new packet header variables, extension fields to carry a proof of integrity blob or container, a canary stamp, or a hardware fingerprint and an associated verifiable proof of possession of the hardware fingerprint.

7. The method of claim 1, wherein:
the first computing node and the second computing node are computing nodes of a synchronous ethernet (SyncE) network, and
the message includes proof of freshness that includes a signature using a private key, the private key including a Secure Unique Device Identifier (SUDI) or attestation key.

8. A first computing node, comprising:
one or more processors; and
one or more non-transitory computer-readable media storing computer-executable instructions that, when executed by the one or more processors, cause the one or more processors to perform operations of:
receiving frequency information of a system clock from a second computing node via a first layer of a connection between the first computing node and the second computing node, the first layer corresponding to a physical layer of the connection; and
receiving a message from the second computing node via a second layer of the connection between the first computing node and the second computing node, the second layer corresponding to a layer above the physical layer of the connection, the message including an attestation of the frequency information from which the first computing node may verify that the second computing node is a trusted source of the frequency information.

9. The first computing node of claim 8, wherein:
the attestation is included in a field of the message.

10. The first computing node of claim 8, wherein:
the attestation is within a type-length value (TLV) encoding in the message.

11. The first computing node of claim 8, wherein:
the first computing node and the second computing node are computing nodes of a synchronous ethernet (SyncE) network; and
the message is an Ethernet Synchronization Message Channel (ESMC) message.

12. The first computing node of claim 11, wherein:
the attestation is within a future enhancement TLV portion of the ESMC message.

13. The first computing node of claim 8, wherein:
the attestation includes at least one of new packet header variables, extension fields to carry a proof of integrity blob or container, a canary stamp, or a hardware fingerprint and an associated verifiable proof of possession of the hardware fingerprint.

14. The first computing node of claim 8, wherein:
the first computing node and the second computing node are computing nodes of a synchronous ethernet (SyncE) network, and
the message includes proof of freshness that includes a signature using a private key, the private key including a Secure Unique Device Identifier (SUDI) or attestation key.

15. One or more non-transitory computer-readable storage media storing computer-readable instructions that, when executed, instruct one or more processors of a first computing node to perform operations comprising:
receiving, from a second computing node, frequency information of a system clock via a first layer of a connection between the first computing node and the second computing node, the first layer corresponding to a physical layer of the connection; and
receiving, from the second computing node, a message via a second layer of the connection between the first computing node and the second computing node, the second layer corresponding to a layer above the physical layer of the connection, the message including an attestation of the frequency information from which the first computing node may verify that the second computing node is a trusted source of the frequency information.

16. The one or more non-transitory computer-readable storage media of claim 15, wherein:
the attestation is included in a field of the message.

17. The one or more non-transitory computer-readable storage media of claim 15, wherein:
the attestation is within a type-length value (TLV) encoding in the message.

18. The one or more non-transitory computer-readable storage media of claim 15, wherein:
the first computing node and the second computing node are computing nodes of a synchronous ethernet (SyncE) network; and
the message is an Ethernet Synchronization Message Channel (ESMC) message.

19. The one or more non-transitory computer-readable storage media of claim 15, wherein:
the attestation includes at least one of new packet header variables, extension fields to carry a proof of integrity blob or container, a canary stamp, or a hardware fingerprint and an associated verifiable proof of possession of the hardware fingerprint.

20. The one or more non-transitory computer-readable storage media of claim 15, wherein:
the first computing node and the second computing node are computing nodes of a synchronous ethernet (SyncE) network, and
the message includes proof of freshness that includes a signature using a private key, the private key including a Secure Unique Device Identifier (SUDI) or attestation key.

* * * * *